Figure 1:
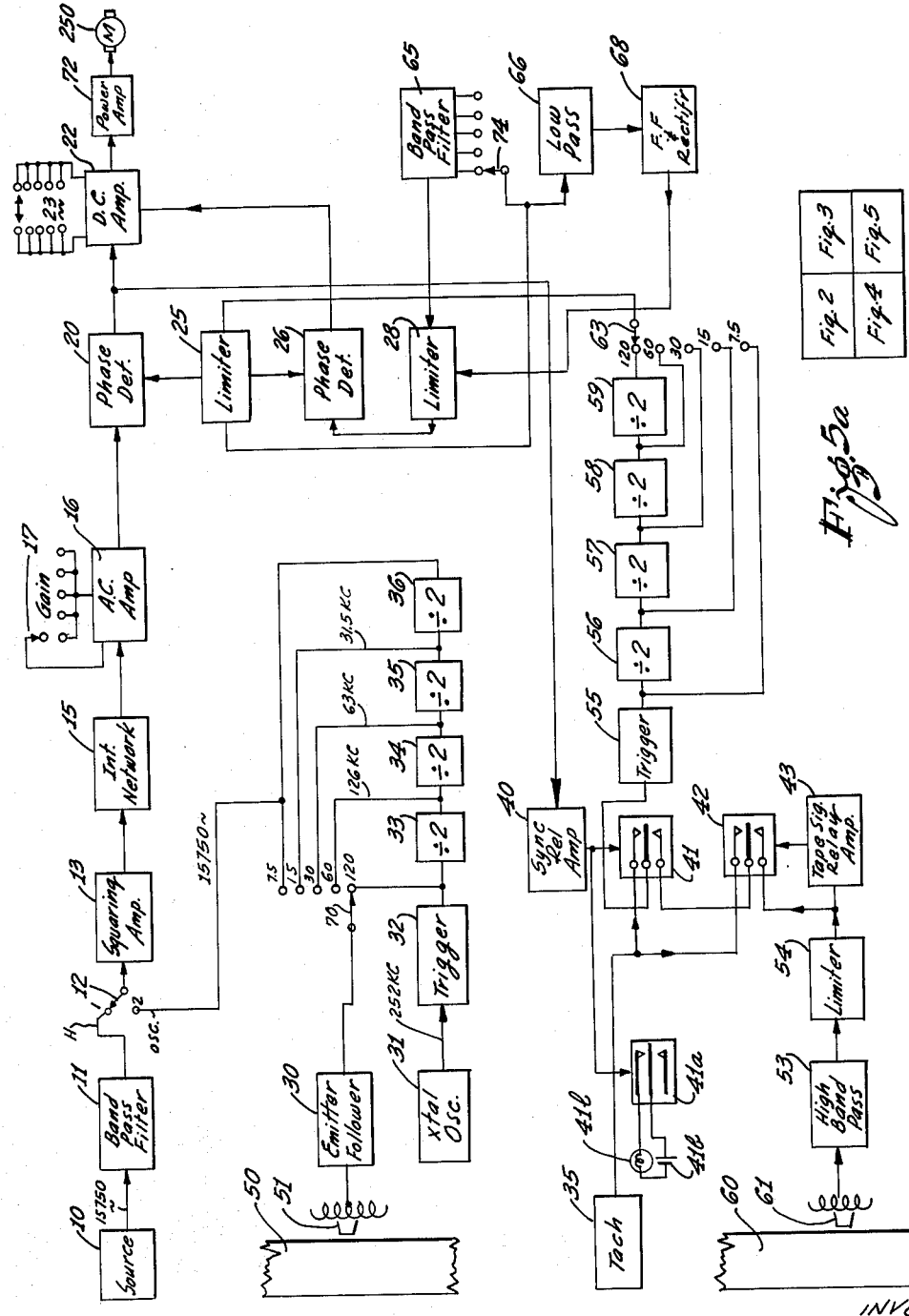

INVENTOR:
Flavio S.C. Branco

United States Patent Office 3,207,970
Patented Sept. 21, 1965

3,207,970
DUAL PHASE D.C. MOTOR SPEED CONTROL SYSTEM
Flavio S. C. Branco, Los Angeles, Calif., assignor to Minnesota Mining and Manufacturing Company, St. Paul, Minn., a corporation of Delaware
Filed Jan. 9, 1961, Ser. No. 81,614
15 Claims. (Cl. 318—314)

This invention relates to speed control and regulating arrangements and, more particularly, to such arrangements for controlling the speed of an adjustable electric motor.

There are many applications in which it is desirable to provide a constant speed electric drive. For example, in recording and reproducing television signals, radar signals, telemetering signals and the like, short period variations in the speed of the recording medium result in phase or angular modulation of the signals. Such variations may either be in the form of drift in the same speed direction or in the form of oscillations in speed about the desired operating speed of the recording medium. Either of these variations may destroy the usefulness of the recording or reproduction.

Various methods have been used to compensate for and minimize the phase modulation resulting from speed variation of an electric drive. Generally, these methods involve the use of a feedback system which varies the effective torque of a synchronous alternating current drive by developing an error signal proportional to the change in speed of the drive from a reference speed. These drives are bulky and expensive and introduce a flutter component to the signals due to the inertia or response time delay of the motor. Shunt type direct current motors are light, reliable and inexpensive but their speed varies readily with every variation in load and even more complex regulating equipment has been required for them than for the synchronous drives.

Direct current motors are generally utilized when variable speed drives are required. For example, in magnetic tape recording and reproducing systems, different tape speeds may be required so that the capstan motor driving the tape must be adjustable over a range of speeds. The present invention relates to such systems, and in a specific illustrative embodiment of this invention, tape speeds of 120, 60, 30, 15 and 7.5 inches per second are required. These tape speeds are provided utilizing a capstan having dimensions such that capstan speeds of 45, 22.5, 11.25, 5.625 and 2.8125 revolutions per second provide respectively for the above tape speeds. These values are typical for the variable speed systems to which this invention has particular application.

In the specific illustrative embodiment of this invention, the number of different control circuits are provided which are effective for different speeds of the motor relative to its selected operating speed. When the motor is started up, a first control circuit is effective to provide for a maximum acceleration of the motor. The first control circuit maintains control of the motor until the speed of the motor exceeds a predetermined speed, illustratively, one-half the selected operating speed for the motor.

A tachometer or other signal having a frequency indicative of the motor speed is introduced to the first control circuit and also to three other control circuits. The first control circuit is coupled to and controls the second control circuit which, in turn, is coupled to and controls the third control circuit of the motor. The first three control circuits form a "rough" control circuit arrangement for the motor and the fourth control circuit forms a "fine" control arrangement for the motor.

The fine control, which is the fourth control circuit, includes means for comparing the phase of the tachometer signal with the phase of a reference signal and for controlling the speed of the motor in accordance with any phase difference therebetween. The fine control is effective essentially in a narrow range of speeds including the selected operating speed. The fine control includes variable amplifier means in the control path to the motor, which amplifier means is controlled by the third control circuit.

The third control circuit also includes phase comparison means having the tachometer signal as one input and a control signal from the second control circuit as the other. When the first control circuit is effective, it operates the second control circuit to provide a miximum signal to the phase comparison means in the third control circuit. The variable amplifier means is, accordingly, adjusted to its maximum gain to provide maximum power to the motor.

The second control circuit includes tuned circuit means to which the tachometer signal is provided. When the first control circuit is not effective, the signal from the second control circuit has a phase determined by the difference in frequency between the tachometer signal frequency and the frequency to which the circuit means is tuned. The signal from the phase comparison means in the third control circuit, accordingly, varies with the variations in phase of the signal from the tuned circuit means. The gain of the variable amplifier means is, in turn, controlled by the signal from the third control circuit. The third control circuit also includes means for effectively inhibiting the rough control in the narrow range of frequencies in which the fine control is effective.

The four control circuits are, accordingly, each effective during different speeds relative to the selected operating speed of the motor. The composite arrangement including the four control circuits provides for a highly accurate and stable motor control circuit.

Figure 3:
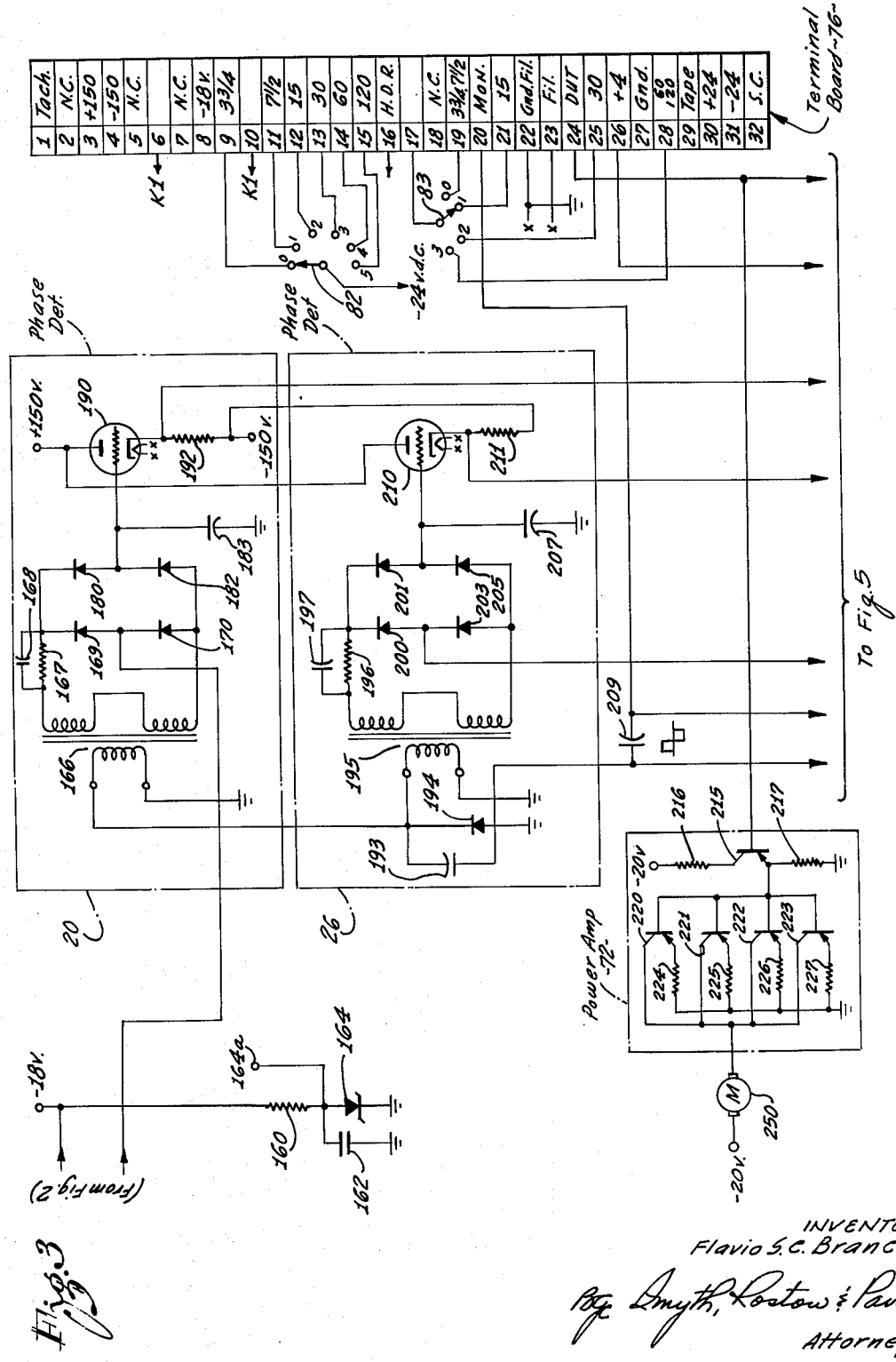
Figure 4:
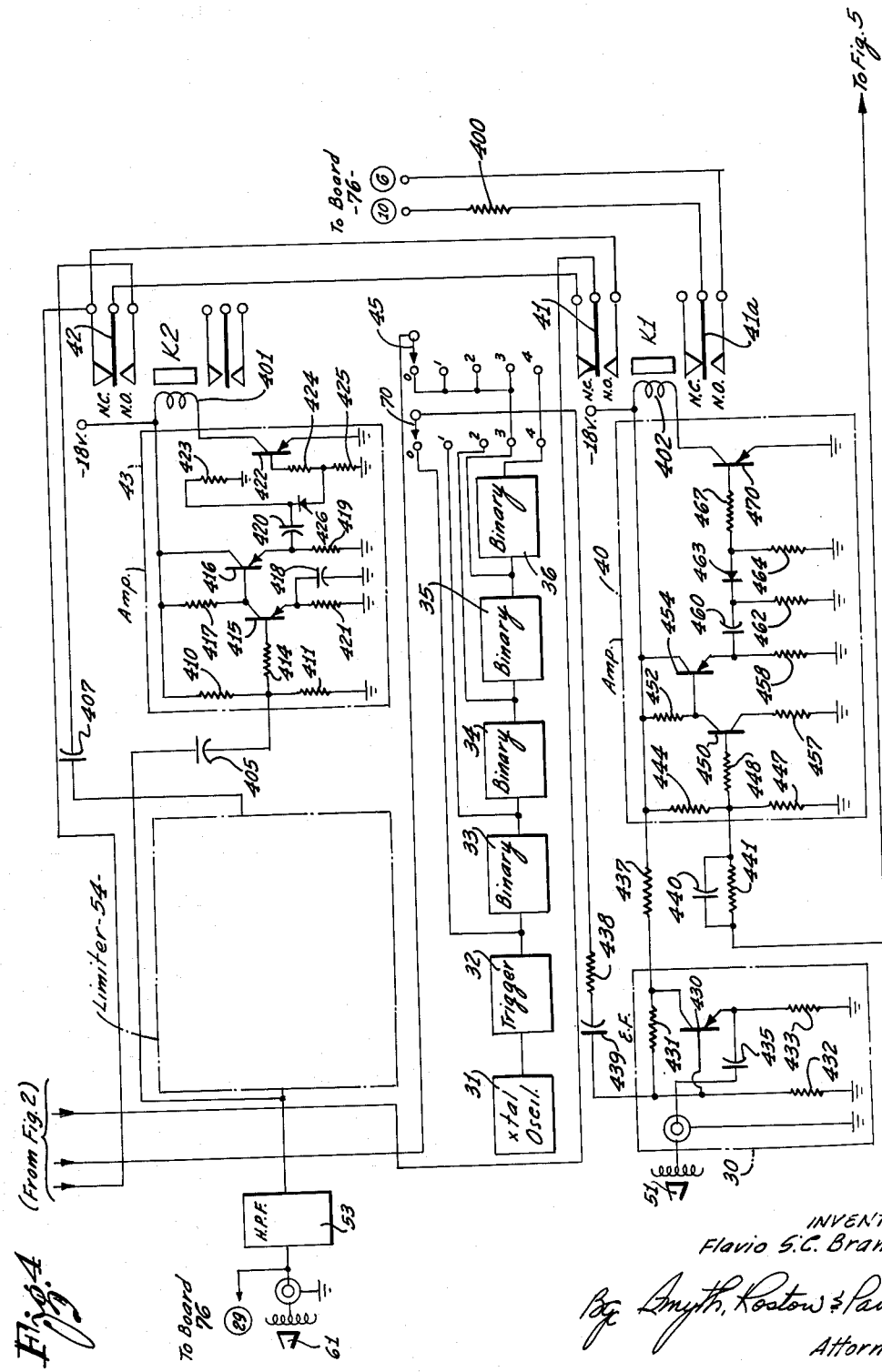
Figure 5:
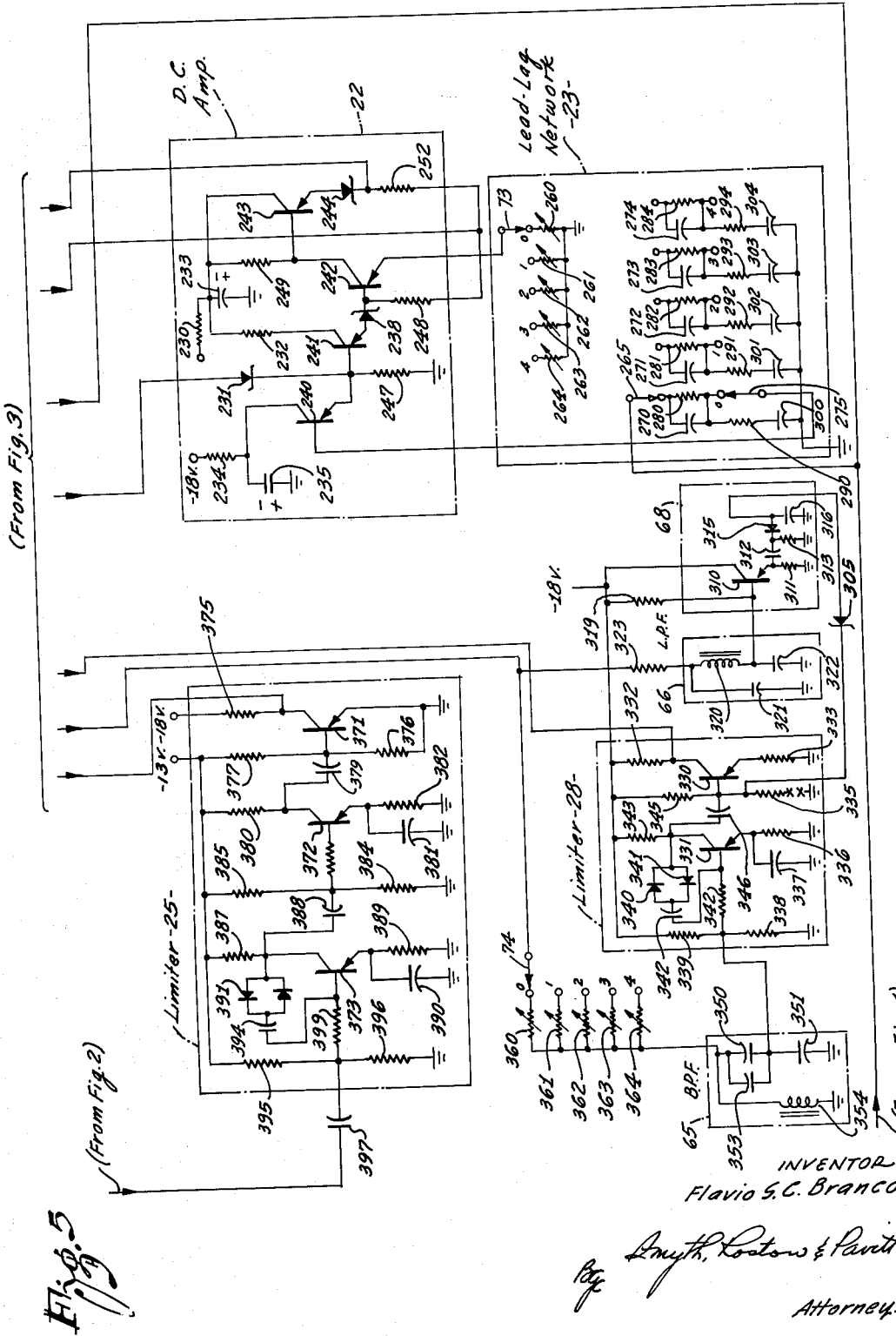

Various other advantages and features of this invention will become apparent to those skilled in the art upon consideration of the following description when read in conjunction with the drawing wherein:

FIGURE 1 is a functional representation of the motor control circuit of this invention;

FIGURES 2 through 5, arranged in accordance with FIGURE 6, are a circuit representation of the motor control circuit of this invention; and FIGURE 5a illustrates the arrangement of FIGURES 2 through 5.

Referring first to FIGURE 1, a motor control is depicted for controlling the speed of a variable speed direct current motor 250 shown at the upper right hand corner of FIGURE 1. The motor control circuit includes a fine control arrangement which has a phase detector 20 for comparing the phase of a reference signal with the phase of a signal indicative of the speed of the motor 250. The motor 250 drives a tachometer 35 shown at the left in FIGURE 1 which develops an alternating current signal having a frequency related to the speed of the motor 250. The motor 250 also is utilized to drive a magnetic tape 60 which may have a reference signal recorded thereon. As is hereinafter described, the reference signal recorded on the tape 60 may also be utilized for the input to the phase detector 20.

The reference signal for the phase detector 20 may be provided from an input source 10 or from a crystal oscillator 31. The position of a switch 12 determines which one of these two sources is utilized for the reference signal to the phase detector 20. With the switch 12 shown in its position 1, as shown in FIGURE 1, the source 10 is utilized for the reference signal. The source 10 provides a reference signal, illustratively at a frequency of 15,750 cycles per second, which is the conventional horizontal line frequency of television signals in the United States. The source 10 may be, for example, a horizontal synchronizing pulse generator circuit or it may be any apparatus for generating the 15,750 pulses per second signal.

The reference pulses from the source 10 are passed through a bandpass filter 11 and the switch 12 to a squaring amplifier 13. The bandpass filter provides a sinusoidal signal at the frequency of 15,750 cycles per second and the squaring amplifier rectangularizes the sinusoidal signal. The bandpass filter 11 removes any noise or other frequency signals, if any, which are present with the reference frequency from the source 10. The rectangularized signal from the amplifier 13 is introduced to an integrator network 15 which develops a triangularly shaped wave at the 15,750 cycle per second frequency. The triangular wave from the integrating network 15 is provided to an adjustable alternating current amplifier 16. As is hereinafter described, a control 17, associated with the amplifier 16, is utilized for adjusting the gain of the amplifier 16. The output of the amplifier 16 may be a clipped wave, trapezoidally shaped, and this wave is introduced as the reference input to the phase detector 20. The frequency of this reference input is constant and, as indicated above, it may be 15,750 cycles per second.

As also described above, the other input to the phase detector 20 may be derived from either the tachometer 35 or from the magnetic tape 60. When the motor 250 is first started up, the phase detector 20 provides for an A.C. output because the reference signal is at the frequency of 15,750 cycles per second whereas the tachometer frequency is increasing from zero cycles per second. The relatively high output from the phase detector 20 is provided to a synchronizing relay amplifier 40 which controls the operation of a pair of associated transfer contacts 41. The tachometer signal is provided from the tachometer 35 through the operated contacts 41 to a chain consisting of a trigger circuit 55 and four binary circuits 56 through 59. An output is taken from one of the five circuits 55 through 59 by a selector switch 63. The switch 63 is utilized to select the operating speed of the motor 250. As illustrated in FIGURE 1, speed settings of 7.5, 15, 30, 60 and 120 inches per second may be selected by the switch 63. The speeds relate to magnetic tape 60 which is driven by the motor 250.

The armature 63 is ganged with an armature 70 at the output of a binary trigger chain connected to the oscillator 31 and consisting of a trigger circiut 32 and four binary circuits 33 through 36. The circuits 32 through 36 are coupled by the switch 70 through an emitter follower to a magnetic recording head 51 positioned adjacent a moving magnetic tape 50. The tape 50 may be integral with the tape 60 or it may be a separate tape. The ganged switch 70 functions effectively to record the same signal frequency on the tape 50 independent of the speed of the tape.

The spacing of the recorded pulses on the tape 50 depends upon the speed of the tape 50 and also the frequency of the signal introduced to the head 51. If the tape speed is doubled by the switch 63, the signal frequency is, accordingly, doubled by the switch 70. The crystal oscillator 31, illustratively, has a frequency of 252 kilocycles and the frequencies from the circuits 33 through 36 are respectively 126, 63, 31.5 and 15.75 kilocycles per second. The recording on the tape 50 is accordingly identical, independent of the speed of the tape 50. The 15,750 cycles per second signal from the circuit 36 is provided to contact 2 of the switch 12. The reference signal to the phase detector 20 can, accordingly, be derived either from the source 10 or from the oscillator 31.

As described above, the tachometer signal or a selected frequency division thereof is coupled from one of the circuits 55 through 59 through the switch 63 to the limiter 25 and thence to the phase detector 20. The signal from the circuits 55 through 59 provide for successively faster motor speeds and corresponding tape speeds. The reason for this is that the signal from the circuit 55 may be at 15,750 cycles per second for a motor speed equivalent to a tape speed of 7.5 inches per second. The signal then from the circuit 55 is respectively at 31.5, 63, 126 and 252 kilocycles per second for tape speeds of 15, 30, 60 and 120 cycles per second. The switch 63 is set accordingly so that the frequency to the limiter 25 is exactly 15,750 cycles per second when the motor 250 is exactly at its selected operating speed and phase. For any other speed or phase, the frequency or phase is different so that an error signal is present at the output of the detector 20.

For example, suppose that the tape speed of 60 inches per second is selected by the switch 63. An error signal from the detector 20 is then present until the motor 250 drives the tachometer 35 to develop a signal frequency of 126 kilocycles. The output of the circuit 58 would then be at 15,750 cycles per second or exactly equal to the reference frequency to the detector 20. The D.C. signal provided by the output of the phase detector will then synchronize the motor to proper speed and phase.

As described above, the tachometer signal is provided through the contacts 41 associated with the amplifier 40 to the trigger circuit 55. The contacts 41 are operated by the relay amplifier 40 as soon as the motor 250 is started but they are returned to normal when the output of the phase detector 20 is at a minimum which is when the motor is synchronized at the selected operating speed. In addition to the contacts 41, the motor control circuit includes transfer contacts 42 controlled by a tape signal relay amplifier 43. The amplifier 43 operates the contacts 42 if a reference frequency is present on the magnetic tape 60 and after the motor 250 brings the tape 60 to a speed greater than a predetermined speed.

A magnetic head 61 is coupled to the tape 60 and develops electrical signals representing the recorded reference signal on the magnetic tape 60. The reproduced signals from the head 61 are introduced to a high bandpass filter 53 which effectively provides the signal only after the motor 250 has come up to the predetermined speed. The filter 53 functions to eliminate hum and other noise at low frequencies. The output of the filter 53 is introduced to a limiter 54 which provides a constant signal regardless of dropouts or variations in the amplitude of the signal. The limited signal from the limiter 54 is introduced to the tape signal relay amplifier 43 for controlling the operation of the contacts 42.

When the contacts 42 are closed, the tachometer signal from the tachometer 35 is still utilized as it is provided through the operated contacts 41. When, however, the motor 250 is pulled into synchronization at its operating speed, the amplifier 40 releases the contacts 41 and completes a path from the limiter 54 for the reproduced signals through the operative contacts 42 and the normal contacts 41. The contacts 41a associated with the amplifier 40 are also returned to normal with the contacts 41 to energize a lamp 41L connected in series with the battery 41b. The lamp 41L is accordingly operated when the motor 250 is being driven at its operating speed.

The signal indicative of the speed of the motor 250 is provided from the trigger chain through the switch 63 to the limiter 25 which was mentioned above. The limiter rectangularizes the signal and introduces it as the second input to the phase detector 20. As described above, the first input to the phase detector 20 is the reference signal from either the source 10 or the crystal oscillator 31 and the output of the phase detector is indicative of the difference in phase between the two signals introduced thereto. The output signal has a polarity which is indicative of the direction of the phase difference between its two input signals. The varying D.C. output signal from the phase detector 20 is provided to a variable gain amplifier 22 which in turn controls a power amplifier 72 coupled to the motor 250. In this manner, the variation in phase of the two signals introduced to the phase detector 20 controls the power delivered and therefore the speed of the motor 250.

The control circuit including the phase detector 20 and the reference signal arrangement and the motor speed signal arrangement function as a fine control for the motor 250. The rest of the functional arrangement depicted in FIGURE 1 forms a composite rough control for the motor 250. The signal from the limiter 25 is also introduced to a low pass filter 66 and to a bandpass filter 65. The limited signal is also provided from the limiter 25 to a second phase detector 26 which may be similar to the phase detector 20. The low pass filter 66 forms part of a first control circuit for the motor 250, the bandpass filter 65 forms part of a second control circuit for the motor 250 and the phase detector 26 forms part of a third control circuit for the motor 250. Each of these control circuits in turn controls some of the others to provide for a composite rough control which together in turn controls the gain of the D.C. amplifier 22 described above.

More particularly, the first control circuit including the low pass filter 66 controls the operation of the second control circuit including the bandpass filter 65 and the second control circuit controls the operation of the third control circuit including the phase detector 26. Finally, the output of the phase detector 26 is introduced to the variable control of the D.C. amplifier 22 to control the gain of the signal from the phase detector 20 and, therefore, the power delivered to the motor 250.

The low pass filter 66 in the first control circuit functions to effectively control the speed of the motor 250 for relatively low speeds of the motor 250, illustratively, below one-half its operating speed. In other words, when the motor is started up and until its speed reaches one-half its operating speed, the phase detector 26 provides for a maximum gain of the D.C. varying signal at the amplifier 22.

The phase detector 26 in the third control circuit compares the phase of two inputs, the first of these inputs being the tachometer signal described above which is provided from the limiter 25. The second input to the phase detector 26 is developed from the tachometer signal at the low pass filter 66 of the first control circuit. The low pass filter 66 passes signals illustratively having frequencies which are less than one-half the frequency corresponding to the operating speed of the motor 250. The output of the low pass filter 66 is rectified and amplified at the emitter follower and rectifier 68 and introduced to the control terminal of a limiter 28 which together with the bandpass filter 65 form the second control circuit. The input to the limiter 28 is received from a bandpass filter 65 to which the tachometer signal from the limiter 25 is also provided. The bandpass filter 65 is a circuit arrangement which receives the tachometer signal and which provides a signal to the limiter 28 having an amplitude and a phase related to the frequency of the tachometer signal. For speeds such that the tachometer signal is less than one-half the frequency corresponding to the operating speed of the motor 250, the control signal from the rectifier and emitter follower 68 to the limiter 28 causes it to provide a control potential to the phase detector 26 which, in turn, provides for a maximum signal to the D.C. amplifier 22. The maximum signal provides for a maximum power to the motor 250 such that the motor is rapidly accelerated toward its operating speed. In this manner, when the motor is started up, the tachometer signal functions to develop a control potential to adjust the D.C. amplifier 22 to provide for a rapid acceleration of the motor 250.

When the motor speed accelerates such that the tachometer frequency is greater than one-half the frequency corresponding to the operating speed of the motor 250, the low pass filter 66 in the first control circuit ceases to pass an effective signal to the rectifier and emitter follower 68 such that the limiter 28 is no longer controlled thereby. The limiter 28 now provides the signal to the phase detector 26 in the third control circuit which is related directly to the signal from the bandpass filter 65 in the second control circuit. The output from the phase detector 26, accordingly, decreases so that the D.C. amplifier 22 decreases the rate of increasing the driving power provided to the motor 250. During this accelerating portion of the motor 250, the phase detector 26 in the third control circuit is effective to control the gain in the amplifier 22. Actually, the accelerating power does not decrease and the motor 250 keeps accelerating because the signal from the detector 26 is being provided to the amplifier 22. The rate of speed increase, however, is now smaller and controlled by the signal from the bandpass filter 65 in the second control circuit.

The closer that the speed of the motor 250 is to its operating speed, the less effective is the phase detector 26 to control the amplifier 22 and the control is then more directly related to the output from the phase detector 20. In the vicinity of the operating speed of the motor 250, the phase detector 20 alone, as part of the fine control arrangement, controls the power delivered to the motor 250. If for any reason the motor speed changes abruptly, by a substantial magnitude, the phase detector 26 again becomes effective to more quickly return the motor to its operating speed.

The phase detector 20, accordingly, is part of a fine control arrangement whereas the three control circuits through the low pass filter 66, the bandpass filter 65 and the detector 26 are rough control arrangements.

A reference signal is recorded on the tape 50, which may be integral with the tape 60 or separate therefrom, which signal is developed from the crystal oscillator 31. The frequency of the oscillator 31, as indicated above, may illustratively be 252 kilocycles. The 252 kilocycle signal is provided from the oscillator 31 to the chain consisting of the circuits 32 through 36. The outputs of the circuits 32 through 36 are connected to contacts of the selector switch 70. The switch 70, which is ganged to the switch 63 and to a switch 74 at the filter 65, is set in accordance with the desired tape speed. At the position shown in FIGURE 1, the tape speed illustratively is 120 inches per second. The frequency of the signal from the switch 70 is different but, as recorded, is independent of the particular tape speed because of the connections to the different outputs of the circuits 32 through 36. The reference signal is coupled through the emitter follower 30 to a recording head 51 associated with the tape 50.

*Detail Circuit Description*

FIGURES 2 through 5, when arranged in accordance with FIGURE 5a, are a detail circuit representation of the motor control circuit of this invention. The designations of the various functional units in FIGURES 2 through 5 correspond to the designation of similar components in FIGURE 1. For example, the motor 250 in FIGURE 3 has the same designation as the motor 250 in FIGURE 1.

The motor 250 is a variable speed motor which is controlled by the motor control circuit depicted in FIGURES 2 through 5. The motor 250 drives the tachometer 35 shown in FIGURE 2 and the tachometer 35 provides for a tachometer signal having a frequency indicative of the speed of the motor 250. The tachometer signal is provided from the tachometer 35 to the normally closed (NC) contact 42 in FIGURE 4 associated with a relay 401 and to the normally open (NO) contact 41 associated with a relay 42. The relay 401 is at the output of the synchronizing amplifier 43 and the relay 402 is at the output of the tape amplifier 40. The relay 402 is operated except when the motor is being driven in synchronization at its operating speed.

Figure 2:
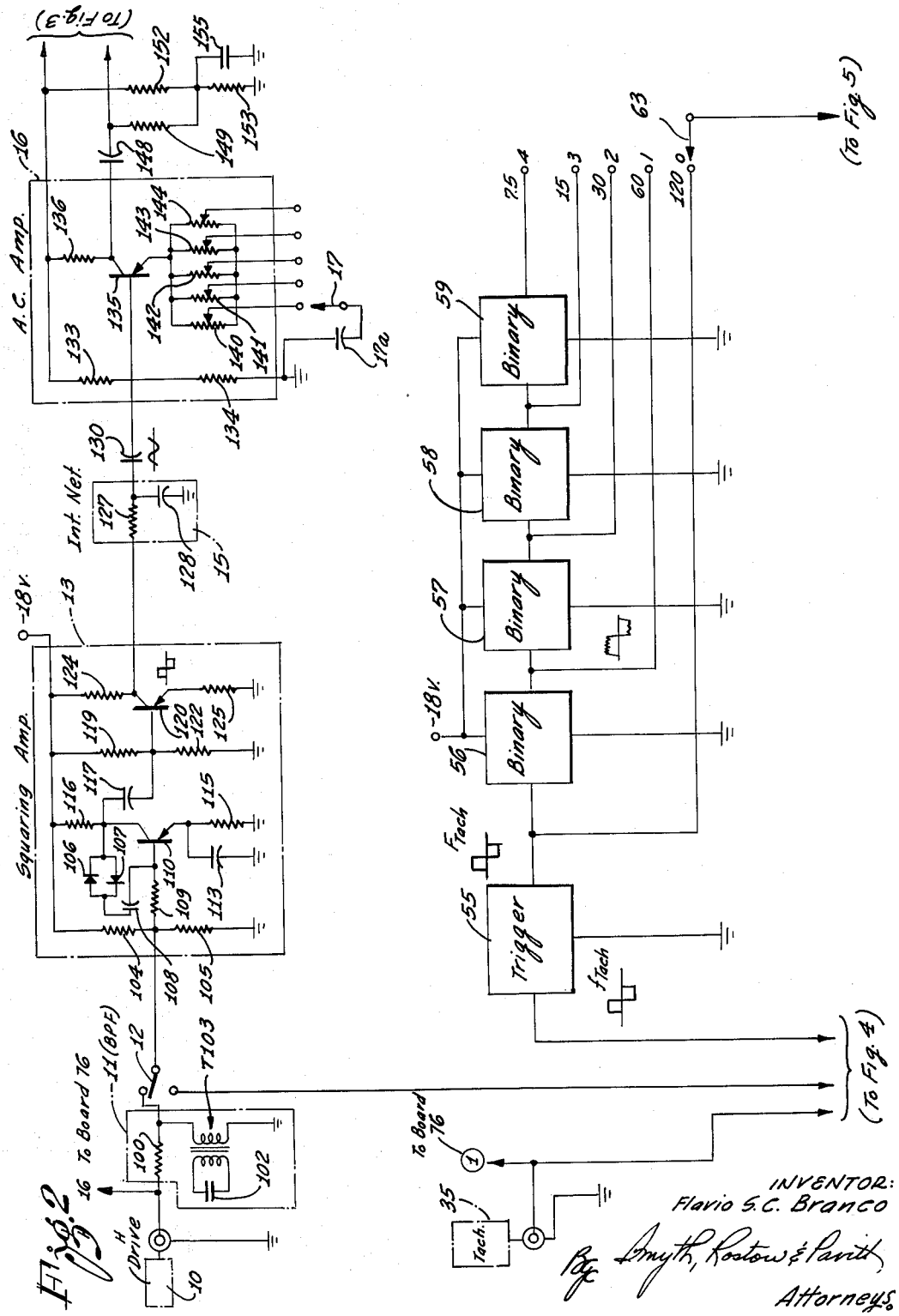

When the motor 250 is started up, the tachometer signal is at first provided through the normally closed contacts 42 and through the normally closed contacts 41 to the chain consisting of the trigger circuit 55 and the binary circuits 56 through 59 in FIGURE 2. The relay 402, however, operates very quickly after the motor 250 is started up responsive to a control signal to the amplifier 40 from the phase detector 20 in FIGURE 3. The operation of the phase detector 20 is further hereinafter described. With the relay winding 402 energized, the tachometer signal is coupled through the normally open (NO) contacts 41 to the trigger circuit 55 in FIGURE 2.

The outputs of the five circuits 55 through 59 are connected respectively to the terminals 0 through 4 of the switch 63. The switch 63 is set to select the speed of the motor 250 and, accordingly, the speed of moving tapes associated with the reproducing head 51 in FIGURE 4 and the recording head 61, also in FIGURE 4. These tapes may be integral or form one tape. As indicated in FIGURE 2, the illustrative tape speeds are 7.5, 15, 30, 60 and 120 inches per second. When the motor is at the corresponding respective operating speeds, the frequency of the signal through the switch 63 is 15,750 cycles per second. The faster the tape is moved, the greater the frequency division by the chain of circuits 55 through 59 that is selected by the switch 63 to provide for the operating 15,750 cycle per second frequency.

The signal from the switch 63 is provided through a capacitor 397 in FIGURE 5 to the limiter 25. The capacitor 397 may have a suitable value such as .05 microfarad. The limiter 25 includes three transistor stages with the last two stages being power amplifier stages and the first stage being the limiting stage. All three stages include junction PNP type transistors, illustratively of the type designated 2N597. The tachometer signal through the capacitor 397 is provided to the base circuit of the transistor 373 and, in particular, to a base resistor 399 having a suitable value such as 4.7 kilohms. The base bias potential is provided from a —13 volt source through a resistor 395 which is connected to the resistor 399 and also to a grounded resistor 396. Resistors 395 and 399 may have suitable values such as 100 kilohms and 10 kilohms respectively. The collector electrode of the transistor 373 is biased from the minus 13 volt source through a resistor 387 which may have a suitable value such as 4.7 kilohms, and the emitter electrode of the transistor 373 is connected to ground by an emitter resistor 389 shunted by a capacitor 390. The resistor 389 may have a suitable value such as 1 kilohm and the capacitor 390 may have a suitable value such as 25 microfarads.

A feedback path is coupled between the collector and emitter electrodes of the transistor 373 which includes two oppositely poled diodes 391 and 392, illustrative of the type designated 1N627. The two diodes are connected in parallel between the collector electrode of the transistor 373 and a capacitor 394 which is connected to the emitter electrode of the transistor 373. The capacitor 394 may have a suitable value such as 1 microfarad. Any signals exceeding a predetermined value of either polarity at the collector electrode of the transistor 373 function to energize the negative feedback path and to reduce the current through the transistor 373. The signal at the collector electrode of the transistor 373 accordingly is a flat top or limited wave at the frequency of the tachometer signal provided through the switch 63 from the chain consisting of the circuits 55 through 59 in FIGURE 2.

The limited signal from the collector electrode of transistor 373 is coupled through a capacitor 388 having a suitable value such as 25 microfarads to the base resistor 374 at the base electrode of the transistor 372. The base resistor 374 may have a value of 4.7 kilohms. The base electrode is biased over a path from the —13 volt source through a resistor 385 and a grounded resistor 384. The junction of these two resistors is connected to the resistor 374. Resistors 385 and 384 may have suitable values such as 100 kilohms and 10 kilohms, respectively. The stage including the transistor 372, as indicated above, functions as a power amplifier for the limited signals from the transistor 373. The emitter electrode of the transistor 372 is connected to ground by an emitter resistor 382 shunted by a capacitor 381. The resistor 382 may have a value of 1 kilohm and the capacitor 381 may have a value of 25 microfarads. The collector electrode is biased through a collector resistor 380 having a suitable value such as 4.7 kilohms.

The amplified output from the collector electrode of the transistor 372 is coupled through a capacitor 379 directly to the base electrode of the power transistor 371. The capacitor may have a value of 25 microfarads. The base electrode is biased over a path from the minus 13 volt source through a resistor 377 and a grounded resistor 376 which may respectively have suitable values such as 27 kilohms and 4.7 ohms respectively. The emitter electrode of the transistor 371 is connected directly to ground and its collector electrode is biased from a minus 18 volt source through a resistor 375. Resistor 375 may have a value of 470 ohms. The output signal from the limiter 25 which is taken from the collector electrode of the transistor 371 has substantial power and is a rectangular or square shape wave at the tachometer frequency, or at a fraction thereof as determined by the setting of the switch 63 in FIGURE 2.

The limited tachometer signal is provided from the limiter 25 through a capacitor 193 to the phase detector 26 and the phase detector 20 in FIGURE 3. The limited signal is also provided through a capacitor 209 to the terminal 20 of a terminal board 76 and back in FIGURE 5 to the low pass filter 66 and through a switch 74 to the bandpass filter 65. These various functional units were all mentioned above in the general description of the operation of the motor control circuit of this invention. The capacitor 193 may have a suitable value such as .01 microfarad and it functions to differentiate the rectangular signal from the limiter 25. The differentiated signal is a series of sharp spikes of positive polarity because the negative polarity signals are eliminated by a diode 194 connected between the capacitor 193 and ground. The diode 194 may be of the type designated 1N99.

The differentiated signals from the capacitor 193 are introduced to the two phase detectors 20 and 26 which are substantially similar, both functioning to compare the phase of two input signals introduced thereto. The first signal introduced to both of the phase detectors 20 and 26 is the differentiated pulses from the capacitor 193. The other input to the phase detector 20 is a reference signal of stable frequency, and the other input to the phase detector 26 is a signal from the limiter 28 in FIGURE 5. The reference frequency signal to the phase detector 20 may be derived from a source 10 in FIGURE 2 or from a crystal oscillator 31 in FIGURE 4, depending upon the setting of the switch 12 in FIGURE 2. With the switch 12 is set as indicated in FIGURE 2 at its contact 1, the source 10 is utilized for the reference signal.

The source 10 may be any circuit or apparatus for providing a fixed frequency, illustratively of a frequency of 15,750 cycles per second. The reference signal from the source 10 is provided to terminal 16 of the terminal board 76 in FIG. 3 and also to a bandpass filter 11 which includes a resistor 100 serially connected between the source 10 and terminal 1 of the switch 12. The resistor 100 may have a suitable value such as 10 kilohms. The junction between the resistor 100 and terminal 1 of the switch 12. The resistor 100 may have a suitable value such as 10 kilohms. The junction between the resistor 100 and terminal 1 of the switch 12 is connected by a tuned circuit to ground. The tuned circuit includes a transformer 103 and a capacitor 102 coupled across the secondary winding of the transformer 103. The windings of the transformer 103 may present an inductance of 70 millihenries and the capacitor 102 may have a suitable value such as .0015 microfarad. The filter 11 is tuned to pass a narrow band of frequencies including that of the source 10 to the switch 12. The reference sinusoidal signal through the bandpass filter 11 is provided through the switch 12 to a squaring amplifier 13.

The squaring amplifier 13 may be essentially quite similar to the limiter 25 described above having a limiting stage including a transistor 110 and a power stage including a transistor 120. The two transistors 110 and 120 may be both 2N497 type PNP junction transistors. The limiting stage including the transistor 110 may be identical to the limiting stage including the transistor 373 described above. The feedback path is provided from the collector electrode of the transistor 110 through the paralleled diodes 106 and 107 and the capacitor 108 to the base electrode. The base electrode is biased from a minus 18 volt source through the serially connected resistors 105 and 104, the junction of which is connected by a resistor 109 to the base electrode of the transistors 110. The emitter electrode of the transistor 110 is connected to ground through a resistor 115 shunted by a capacitor 113 and its collector electrode is biased through a resistor 116. The limited signal is coupled through a capacitor 117 to the base electrode of the transistor 120. The base electrode is biased by a path through two resistors 119 and 122 which may have suitable values such as 165 kilohms and 1.5 kilohms respectively. The collector electrode of the transistor 120 is biased through a resistor 124 which may have a value of 1.5 kilohms and the emitter electrode is connected to ground by an emitter resistor 125 which may have a value of 5 ohms.

The squared or limited signal from the amplifier 13 is provided to an integrating network 15 which includes a resistor 127 and a capacitor 128. The resistor 127 may have a value of 10 kilohms and the capacitor 128, which is connected between the resistor 127 and ground, may have a value of .01 microfarad. The junction between the resistor 127 and the capacitor 128 is coupled by a capacitor 130 to an adjustable A.C. amplifier 16. The integrating network 15 functions to triangularize the rectangular wave introduced thereto. The triangular wave through the capacitor 130 which may have a value of 5 microfarads is amplified by the amplifier 16. The amplifier 16 is adjustable by a five-position switch 17 which controls the slope as well as the gain of the waves coupled through the amplifier 16. The output of the amplifier 16, which is taken from the collector electrode of a junction transistor 135 may have a trapezoidal or clipped triangular shape. The input is provided to the base electrode of the transistor 135 which is biased over a path from a minus 18 volt source in FIGURE 3 through the resistors 133 and 134 to ground. The junction between the resistor 133 and 134 is connected to the base electrode of the transistor 135. The resistors 133 and 134 may have suitable values which is 100 kilohms and 7.5 kilohms respectively. The collector electrode is biased through a resistor 136 which may have a value of 4.7 kilohms. The emitter electrode is connected to a parallel arrangement including five potentiometers 140 through 144 connected to the terminals 0 through 4 of the switch 17. These potentiometers 140 through 144 are set to provide for the desired slope and amplification in the amplifier 16 and are selectively connected by the switch 17 to a grounded capacitor 17a. The capacitor 17a may have a value of 50 microfarads.

The signals from the amplifier 16 are coupled through a capacitor 148 to the phase detector 20. The capacitor 148, which may have a value of 1 microfarad, is connected to ground by a resistor 149 which is serially connected with a resistor 153 shunted by a capacitor 155. The resistors 149 and 153 may have values respectively of 10 kilohms and 3.3 kilohms and the capacitor 155 may have a suitable value such as 50 microfarads. The capacitor 155 and resistor 153 function together to provide for a suitable bias to the phase detector 20. The junction between the resistor 153 and the capacitor 155 is connected by a resistor 152 to the minus 18 volt source in FIGURE 3. The resistor 152 may have a suitable value such as 5.6 kilohms. The D.C. potential bias provided to the phase detector 20 is accordingly determined by the voltage divider network consisting of the resistors 152 and 153.

The A.C. signal from the amplifier 16 modulates this D.C. bias provided to the phase detector 20. The minus 18 volt source in FIGURE 3 is connected by a resistor 160 to a Zener diode 164. The junction between the resistor 160, which may have a value of 15 ohms, and the Zener diode is connected to a terminal 164a and by a capacitor 162 to ground. The capacitor 162 may have a value of 100 microfarads. The circuit arrangement including the Zener diode 164 serves to develop the minus 13 volt potential at the terminal 164a. This potential is utilized in the various functional units throughout the motor control circuit of this invention.

The clipped triangular wave is provided in FIGURE 3 to the junction of two diodes 169 and 170 in the phase detector 20. The phase detector 20 is of a conventional type having four diodes 169, 170, 180 and 182 poled in similar directions and coupled in parallel pairs. The output from the diode arrangement is taken from the junction of the two diodes 180 and 182. The second input to the phase detector 20 is the limited tachometer signal differentiated by the capacitor 193 as described above. The sharp spikes from the capacitor 193 are introduced across a transformer 166 to a capacitive circuit including a capacitor 168 shunted by a resistor 167. The output from the four diode arrangement has a magnitude and polarity depending upon the time coincidence of the sharp spikes of current through the capacitor 168 and the clipped triangular wave introduced as the reference signal from the alternating current amplifier 16 in FIGURE 2. The capacitor 168 may have a suitable value such as .25 microfarad, the resistor 167 may have a suitable value such as 100 kilohms and the four diodes may be of the type 1N627.

The signal from the junction of the two diodes 180 and 182 is provided across a capacitor 183 which may have a value of .005 microfarad. The capacitor faces a high impedance so that it stores the charge between the successive pulses coupled through the capacitor 168. The signal across the capacitor 183 is, accordingly, a D.C. step signal or a variable D.C. signal. The variable D.C. signal is introduced to the grid of a triode vacuum tube 190 which forms a cathode follower stage for the phase detector 20. The anode of the triode 190 is connected to a plus 150 volt source and the cathode is connected through a cathode resistor to a minus 150 volt source. The output from the cathode follower stage is taken from the cathode of the triode 190 and provided to a lead lag network 23 in FIGURE 5. In the cathode follower stage of the detector 20, a vacuum tube instead of a transistor is utilized to obtain a very high impedance and the tube 190 is balanced with respect to ground to make the cathode potential near ground potential.

The lead lag network 23 is utilized for stabilization of the servo loop and is changed for each speed setting determined by the switch 63. The two switches 265 and 275 in the lead lag network 23 are ganged with the switch 63 in FIGURE 2. The variable D.C. signal from the phase detector 20 is introduced through the switch 265 in the lead lag network 23 to one of five capacitor circuit arrangements. The five circuit arrangements include respectively the capacitors 272 through 274, the resistors 280 through 284 connected in parallel therewith, and a serial arrangement including respectively the resistors 290 through 294 and capacitors 300 through 304. The capacitors 270 through 274 may have suitable values respectively such as .02, .02, .05, .1 and .1 microfarad; the resistors 280 through 284 may have suitable values such as 27 kilohms, the resistors 290 through 294, which may be rheostats, may have suitable values up to 2 kilohms; and the capacitors 300 through 304 may have suitable values such as 5 microfarads each.

The signal is taken through the switch 275 from the selected shifting network or capacitor arrangement and provided to a D.C. amplifier 22. As is hereinafter described, the D.C. amplifier 22 has an adjustable gain and it amplifies the variable D.C. signal from the network 23 and introduces it to a power amplifier 72 in FIGURE 3 which is at the input of the motor 250. The D.C. amplifier 22 includes four stages, the first two of which are emitter followers to increase the impedance isolation of the variable signal, the third stage is a gain stage and the fourth stage is again an emitter follower stage. Each of the four stages includes a junction transistor illustratively of the type 2N597 which have respectively reference designations 240 through 243.

The variable D.C. input signal from the network 23 is introduced directly to the base electrode of the transistor 240. The collector electrode of the transistor 240 is biased from a minus 18 volt source through a resistor 234 having a value of 10 kilohms, and the emitter electrode is biased to ground through a resistor 247 which has a value of 47 kilohms. The collector electrode is also coupled to ground by a capacitor 235 having a suitable value such as 50 microfarads. The output of the first emitter follower stage taken from the emitter electrode is introduced directly to the base electrode of the transistor 241. The collector electrode of the transistor 241 is biased over a path from a negative potential source through two resistors 230 and 232 having suitable values such as 470 ohms and 100 ohms respectively. The junction of these two resistors is coupled to ground by a capacitor 233 which may have a value of 50 microfarads. The emitter electrode is connected to a Zener diode 238 which changes the D.C. level of the variable D.C. signal to the amplifier 22. The signal from the Zener diode 238 is introduced to the base electrode of the transistor 242 in the gain stage of the amplifier 22.

The gain of the stage is controlled in part by a switch 73 which is ganged with the switch 63 in FIGURE 2. The switch 73 is connected to one of five grounded rheostats 260 to 264 which may have suitable maximum values of 500 ohms. These rheostats are utilized for adjusting the gain of the amplifier 22 for each speed. The collector electrode of the transistor 242 is biased through the resistor 230 and a resistor 249 which may have a value of 1.8 kilohms. The base electrode of the transistor 242 is coupled through a resistor 248 to terminal 26 of the board 76 and which is at a small positive potential. The amplified signal from the transistor 242 is provided from its collector electrode to the base electrode of the emitter follower transistor 243. The emitter of the transistor 243 is coupled by a Zener diode 242 to a resistor 252 which may have a value of .5 kilohm. The resistor 252 is connected also to the terminal 26 of the board 76. The collector electrode of the transistor 243 is connected to the resistor 230. The output from the D.C. amplifier 22 is taken from the junction between the Zener diode 244 and the resistor 252 and provided to the output terminal 24 of the board 76 and also to the power amplifier 72.

For each particular operating speed of the motor 250 and, accordingly, for each setting of the switch 73, the gain of the D.C. amplifier 22 is at a fixed value except for the influence of a control signal from the phase detector 26 which was briefly mentioned above. The control signal is introduced through a Zener diode 231 to the base electrode of the transistor 241. Actually, it is not the gain of the amplifier 22 which is adjusted but an additional input signal is provided which is added across the resistor 247. The signal provided through the Zener diode 231 from the phase detector 26 provides for a maximum signal from the amplifier 22 and, accordingly, for a maximum amount of power to the motor 250 in FIGURE 3 for a relatively low operating speed illustratively below one-half the selected operating speed.

The signal to the power amplifier 72 is introduced to the base electrode of a junction transistor which may illustratively be of type 2N386. The transistor 215 forms part of an emitter follower stage and has its emitter electrode connected to ground by a resistor 217 having a value of 270 ohms and its collector electrode connected to a minus 20 volt source by a resistor 216 having a value of 6 ohms. The emitter electrode of the transistor 215 is coupled to the base electrodes of four parallel transistors 220 through 223 which may be illustratively of the type 2N174. The collector electrodes of the transistors 220 through 223 are multiplied together and connected to the motor 250. The emitter electrodes of the transistors 220 through 223 are connected to ground respectively through resistors 224 through 227 which may have suitable values such as 0.5 ohm each. In this manner, the motor 250 is accelerated from standstill responsive to the varying D.C. signal from the phase detector 20 which is coupled through a lead lag network 23 to the D.C. amplifier 22. The amplified signal is then introduced to the power amplifier 72 at the input of the motor 250.

As described above, the reference signal may be derived from the source 10 or from the crystal oscillator 31. The oscillator 31 drives a chain of circuits 32 through 36, the outputs of which are coupled to the terminals of a switch 70. The terminals 3 and 4 are coupled in turn to terminals of a switch 45 which is ganged to the switch 70 in FIGURE 4 and the switch 63 in FIGURE 2. For the first four terminals 0 to 3 of the switch 45, one frequency is coupled from the switch 45 to contact 2 of the switch 12 of FIGURE 2, and for the fifth position at terminal 4 of the switch 45 another frequency relative to the oscillator frequency is utilized. When the switch 12 is in its position 2, one or the other of these two frequencies, depending upon the operating speed selected, is coupled through the switch 12 and utilized for developing the reference signal to the phase detector 20. The frequency of the signal from the binary circuit 36 may illustratively be 15,750 cycles per second and from the binary circuit 35 it may illustratively be 31.5 kilocycles per second.

The different frequencies through the switch 70 at the outputs of the circuits 32 through 36 are provided through a resistor 438 and a capacitor 439 to the emitter follower 30. The resistor 438 may have a suitable value such as 10 kilohms and the capacitor 439 may have a suitable value such as .01 microfarad. The emitter follower 30 couples the signal from the switch 70 to a recording head 51 which is associated with a moving magnetic tape, not shown, in FIGURE 4. The frequency, as recorded on the tape, is the same independent of the operating speed of the motor 250 and the tape due to the frequency selection by the switch 70.

The emitter follower 30 includes a transistor 430 and the signals to be recorded are introduced to its base electrode across a resistor 432. The resistor 432 may have a suitable value such as 10 kilohms. The base electrode is biased over a path from a minus 18 volt source through a resistor 437 which may have a value of 100 oms. The collector electrode is also connected by a resistor 431 to the base electrode of the transistor 430. The resistor 431 may have a value of 10 kilohms and it functions together with the resistor 437 and the resistor 432 as a voltage divider arrangement between the minus 18 volt source and ground. The emitter electrode of the transistor 430 is connected to ground by a resistor 433 having a value of 1.2 kilohms. The output is taken from the emitter electrode and coupled through a capacitor 435 having a value of 1 microfarad to the recording head 51.

As the motor 250 accelerates, the control is transferred from the tachometer 35 of FIGURE 2 to a reproducing head 61 in FIGURE 4 if reference signals are recorded on a magnetic tape, not shown, which is positioned relative thereto. The magnetic tape 60 in FIGURE 1 is positioned relative to the reproducing head 61 but is not shown in FIGURE 4. When the tape comes up to speed, the recorded reference signals are picked up by the head 61 and coupled through a bandpass filter 53 which provides an output signal when the frequency exceeds a predetermined value. The signal is introduced to a limiter 54 which is substantially the same as the above-described limiter 25 in FIGURE 5. The limited signal is coupled through a capacitor 407, having a suitable value such as 0.25 microfarad, to the normally open contact 42.

The signal from the filter 53 is also coupled through a capacitor 405, having a suitable value such as 0.01 microfarad, to the amplifier 43. When this signal exceeds a predetermined magnitude, the amplifier 43 operates its associated relay 401 to move the transfer contact 42. The amplifier 43 includes three stages, the first of which is an A.C. amplifier, the second of which is an emitter follower, and the third of which is a D.C. switch.

The A.C. amplifier stage includes a transistor 415 which may be of the type 2N597 as well as are the other two transistors 416 and 422 in the amplifier 43. The reference signal is introduced to the base resistor 414 coupled to the base electrode of the transistor 415. The base electrode is biased over a path from the minus 18 volt source through the serially connected resistors 410 and 411 which may have suitable values such as 100 kilohms and 10 kilohms respectively. The resistor 414 may have a value of 4.7 kilohms. The collector electrode is biased over a path through a resistor 417 having a value of 4.7 kilohms and the emitter electrode is biased to ground over a path through a resistor 421 having a value of 1 kilohm and shunted by a capacitor 418 having a value of 6 microfarads. The output from the A.C. amplifier stage is taken from the collector electrode of transistor 415 and provided to the base electrode of the transistor 416. The emitter electrode, which is connected to ground by a resistor 419, provides the output from the emitter follower stage through a coupling capacitor 420 to a diode 426.

The diode 426 functions as a half wave rectifier having its cathode connected by a resistor 423 to ground and its anode connected by a resistor 425 to ground. The capacitor 420 may have a value of 6 microfarads and the resistors 423 and 425 may have values of 10 kilohms each. The base electrode of the transistor 422 is serially connected to ground through a resistor 424 and the resistor 425. The resistor 424 may have a value of 4.7 kilohms. The collector electrode of the transistor 422 is serially connected with the winding 401 to the minus 18 volt source and the emitter electrode of the transistor 422 is coupled to ground.

When the relay contacts 42 are operated, a path is established from the limiter 54 through the capacitor 407 and the operated contacts 42 to the upper contact 41 associated with the relay 402. The relay 402, as described above, is operative and remains operative until the motor 250 is pulled into approximate synchronization at its operating speed. When this occurs, the amplifier 40 releases the relay 402 to extend the path from the operative contacts 42 through the upper contact 41 to the trigger circuit 55 in FIGURE 2. In this manner, when the contacts 42 operate and then the contacts 41 return to normal, the control is transferred from the tachometer 35 to the signal recorded on the moving magnetic tape and reproduced by the reproducing head 61. Contacts 41a associated with the relay 402 are returned to normal together with the contacts 41 to complete a path through a resistor 400 to terminals 6 and 10 of the terminal board 76 in FIGURE 3. This path, when completed, energizes a lamp not shown in FIGURE 3 but mentioned above (41) in reference to FIGURE 1. The lamp is energized to indicate that the motor 250 is being driven in synchronization at its operating speed.

The control circuit including the phase detector 20 in FIGURE 3 and the reference signal arrangement in FIGURE 4, which was just described, function as a fine control for the motor 250. The rest of the motor control circuit depicted in FIGURES 2 through 5 form a compositive rough control for the motor 250. As described above, the signal from the limiter 25 in FIGURE 5 is also introduced to a low-pass filter 66 and to a bandpass filter 65, both shown also in FIGURE 5. The low-pass filter 66 forms part of a first control circuit for the motor 250, the bandpass filter 65 forms part of a second control circuit for the motor 250 and the phase detector 26 in FIGURE 3 forms part of a third control circuit for the motor 250. These three control circuits together form the composite rough control for the motor 250. Each of these three control circuits in turn controls some of the others to provide for the composite rough control which controls the gain of the D.C. amplifier 22 described above.

More particularly, the first control circuit including the low-pass filter 66 controls the operation of the second control circuit including the bandpass filter 65 and the second control circuit controls the operation of the third control circuit including the phase detector 26. Finally, the output of the phase detector 26 is introduced, as described above, to the Zener diode 231 in the D.C. amplifier 23 to control the signal provided from the D.C. amplifier 22 to the power amplifier 72 in FIGURE 3.

The signal from the limiter 25, which is described above as indicative of the instantaneous speed of the motor 250, is coupled through the capacitor 209 to a resistor 323 at the low-pass filter 66. The low-pass filter 66 includes an inductor 320 serially connected with a capacitor 322 to ground and a capacitor 321 which shunts the serially connected inductor 320 and capacitor 322. The resistor 323 may have a value of 2.4 kilohms, the inductor 320 may have a value of 100 millihenries, and the two capacitors 321 and 322 may each have a value of 0.01 microfarad. The filter 66 passes any relatively low frequency signals to an emitter follower and rectifier 68 shown also in FIGURE 5. The output from the filter 66 is taken from the junction of the inductor 320 and the capacitor 322 and introduced to the base electrode of a junction transistor 310 in the circuit 68.

The transistor 310 may be of the type designated 2N597 and has its emitter electrode connected to ground by a resistor 311 and its collector electrode connected directly to a minus 18 volt source. The base electrode of the transistor 310 is also coupled to the minus 18 volt source by a resistor 319. The resistor 319 and the resistor 311 may have suitable values such as 100 kilohms and 1.2 kilohms respectively. The cathode follower transistor 310 serves as an impedance isolation stage between the low-pass filter 66 and the rectifier consisting of the diode 315. The diode 315 is coupled by a capacitor 312 to the emitter electrode of the transistor 310. The diode may be of the type designated 1N99 and the capacitor 312 may have a suitable value such as 25 microfarads. The junction between the capacitor 312 and the diode 315 is connected to ground by a resistor 313 having a suitable value such as 1.2 kilohms. The anode of the diode 315 is coupled by a capacitor 316 to ground. The capacitor 316 may have a suitable value such as 6 microfarads. The capacitor 316 is charged successively by the rectified pulses through the half wave rectifier consisting of the diode 315. The rectified signal is introduced from the capacitor 316 through a Zener diode 305 to the limiter 28.

During the time that the rectified signal from the circuit 68 exceeds a predetermined value, a transistor 330 in the limiter 28 is saturated to provide for a maximum signal to the phase detector 26. The phase detector 26 in the third control circuit compares the phase of two inputs, the first of these being the tachometer signal described above which is provided from the limiter 25. The second input to the phase detector is developed from the tachometer signal at the low-pass filter 66 of the first control circuit. The control signal from the low-pass filter 66 is rectified and introduced to the control terminal of the limiter 28 which also receives an input or control signal from the bandpass filter 65 mentioned above. During the time that the low-pass filter 66 is effective, which is for relatively low speed of the motor 250, the output transistor 330 in the limiter 28 is fully saturated to provide for a maximum signal to the phase detector 26 independent of the signal from the bandpass filter 65 to the limiter 28. In this manner, for speeds of the motor 250 which are relatively small, a maximum signal is provided from the phase detector 26 to the D.C. amplifier 22 to provide for a maximum acceleration of the motor 250. The motor 250, accordingly, rapidly accelerates toward its operating speed.

As the motor 250 continues to accelerate, the signal through the low-pass filter 66 decreases so that the signal from the bandpass filter 65 becomes effective to control the output from the limiter 28. The Zener diode 305 between the limiter 28 and the emitter follower and rectifier 68 effectively becomes an open circuit or functions to disconnect these circuits. The low-pass filter 66, accordingly, becomes isolated from the limiter 28 and ineffective to control the speed of the motor 250 for speeds exceeding the range of speeds in which it is effective.

The limited signal from the limiter 25 is provided through the capacitor 209 to a switch 74 which is ganged with the rest of the switches in the motor control circuit. The five terminals 0 through 4 of the switch 74 are coupled respectively through rheostats 360 through 364 to the bandpass filter 65. The rheostats 360 through 364 are set in accordance with the particular selectable operating speeds of the motor 250. The bandpass filter 65 includes two parallel capacitors 350 and 355 which are connected by a capacitor 351 to ground. The capacitors 350 and 353 may have values of .005 microfarad and the capacitor 351 may have a value of .05 microfarad. This capacitive arrangement is shunted by an inductor 354 which may have a value of 20 millihenries. The bandpass filter 65 including the rheostats 360 through 364 passes frequencies in the range of the selected operating speeds.

The signal through the bandpass filter 65 is taken from the junction of the capacitors 350 and 351 and introduced to the junction of the three resistors 339, 338 and 342 in the limiter 28. These resistors may have suitable values such as 100 kilohms, 10 kilohms and 4.7 kilohms respectively. The resistors 339, 338 form a voltage divider arrangement between the minus 18 volt source and ground, and the resistor 342 is connected in the base circuit of a transistor 331. The arrangement of the limiter 28 is substantially similar to the first two stages in the limiter 25 described above. The feedback path is provided from the collector electrode of the transistor 331 through two oppositely poled diodes 340 and 341 and a capacitor 342 to the base electrode of the transistor 331. The emitter electrode of the transistor 331 is connected to ground by a resistor 336 shunted by a capacitor 337. These various components may have similar values as their corresponding components in the limiter 25. The collector electrode is biased through a resistor 343 and the limited output from the collector electrode is coupled through a capacitor 346 to the base electrode of the transistor 330, briefly mentioned above. The base electrode of the transistor 330 is biased through a resistor 345, the collector electrode is biased through a resistor 332 and the emitter electrode is biased through a resistor 333. The resistors 345, 332 and 333 may respectively have values of 168 kilohms, 125 kilohms and 5 ohms respectively.

The output is taken from the collector electrode on the transistor 330 and introduced to the junction of the diodes 200 and 203 in the phase detector 26. In this manner, in the absence of a control signal through the Zener diode 305 from the low-pass filter 66 and circuit 68, a signal is provided from the limiter 28 which has a phase and polarity related to the speed of the motor 250 relative to its operating speed. The signal is indicative to the motor speed because the bandpass filter 65 is a tuned circuit which is tuned to the fundamental frequency indicative of the selected operating speed.

The phase detector 26 includes four diodes 200, 203, 201 and 205, a transformer 195, a capacitor 197 shunted by a resistor 196 and the cathode follower tube 210. The cathode of the tube 210 is coupled by a resistor 211 to the minus 150 volt source shown in the phase detector 20 and its anode is coupled to the plus 150 volt source. The phase detector 26, accordingly, compares the phase of the signal from the limiter 25, which is introduced through the transformer 195 with the phase of the signal from the limiter 28.

The output signal from the phase detector 26 is introduced to the Zener diode 231. The closer that the speed of the motor 250 is to its operating speed, the less effective is the phase detector 26 for controlling the amplifier 22. For speeds relatively close to the operating speed, the Zener diode 231 functions effectively to isolate the phase detector 26 from the D.C. amplifier 22. In this manner, the D.C. amplifier 22 is controlled solely as part of the fine control arrangement including the phase detector 20 in the immediate vicinity of the selected operating speed. If for any reason the motor speed changes by a substantial factor, the phase detector 26 again becomes effective as it breaks down the Zener diode 231 and thereby functions to more quickly return the motor 250 back to its operating speed.

The phase detector 20 is, accordingly, part of the fine control arrangement whereas the speed control circuit through the low-pass filter 66, the bandpass filter 65 and the detector 26 are part of a composite rough control arrangement.

As described above, the motor control circuit includes a number of switches which are ganged and which are set to select the particular operating speed of the motor 250. In addition to the switches already described, the motor control circuit includes a pair of switches 82 and 83 shown in FIGURE 3 which are also ganged and which are set to connect potentials to suitable terminals in the motor control circuit.

During the operation of the motor control circuit, a reference signal is recorded on a magnetic tape associated with a recording head 51 shown at the lower left hand corner of FIGURE 4. The recording head 51 is positioned relative to a moving magnetic tape not shown in FIGURE 4 but described above in FIGURE 1 as the tape 50. The tape may be integral with the tape adjacent the reproducing head 61 or it may be a different tape. The signal recorded by the recording head 51 is developed from the crystal oscillator 31 also shown in FIGURE 4. As described above, the frequency of the oscillator 31 may illustratively be 252 kilocycles. The 252 kilocycle signal is provided from the oscillator 31 to the chain consisting of the five circuits 32 through 36. The respective output of the circuits 32 through 36 are connected to the contacts of the selector switch 70. The switch 70, which is ganged to the switch 63, is set in accordance with the desired tape speed. At the position shown in FIGURE 4, a tape speed illustratively of 120 inches per second is selected. The frequency from the switch 70 is independent of the particular tape speed because of the connections to the different outputs of the circuits 30 through 36. The reference signal is coupled through the emitter follower 30 to the recording head 51. The emitter follower 30 includes the transistor 430 and the output is taken from the emitter electrode of the transistor 430 and capacitively coupled through a capacitor 435 to the recording head 51. The recorded signal is the same independent of the tape speed because the switch 70 varies the frequency introduced to the recording head 51 to compensate for the changes in the tape speed.

I claim:

1. A speed control circuit for a motor, including, a source for supplying a reference signal of substantially constant frequency, signal means coupled to the motor for developing a signal having a variable frequency related to the instantaneous speed of rotation of the motor, a phase detector coupled to said source and to said signal means for comparing the phase of the variable signal from the signal means with the phase of said reference signal to produce an error signal having characteristics in accordance with the results of such comparison, an adjustable amplifier having an adjustable gain and coupled to said phase detector and to said motor for varying the energy delivered to said motor in accordance with variations in the characteristics of the error signal from said phase detector, and frequency responsive means coupled to said signal means for adjusting the gain of said adjustable amplifier by particular amounts in accordance with variations in the frequency of the variable signal from said signal means.

2. A speed control circuit for a motor, including, a fine control circuit coupled to the motor for controlling the speed of the motor in a first range of speeds near the operating speed of the motor, said fine control circuit including adjustable circuit means having a gain variable in accordance with adjustments in the adjustable circuit means, the adjustable circuit means being coupled to the motor for varying the energy delivered to the motor by the fine control circuit in accordance with variations in the speed of the motor from the operating speed, and a rough control circuit including first means operatively coupled to the motor and responsive to a second range of speeds of the motor considerably removed from the operating speed of the motor for increasing the gain of the adjustable circuit means to obtain the introduction of maximum energy from said fine control circuit to the motor, and second means operatively coupled to the motor and responsive to a third range of speeds of the motor between the first and second range of speeds for introducing a variable signal to the adjustable circuit means in accordance with variations in the speed of the motor in the third range of speeds to obtain corresponding variations in the energy introduced to the motor.

3. A speed control circuit in accordance with claim 2, wherein said fine control circuit includes a source for supplying a reference signal of substantially constant frequency, signal means coupled to the motor for developing a signal having a variable frequency related to the instantaneous speed of the motor, a phase detector coupled to said source and to said signal means for comparing the phase of the variable signal with the phase of said reference signal to produce an error signal having variable characteristics in accordance with the results of such comparison, and means operatively coupled to said phase detector and to said adjustable circuit means for adjusting the gain of said adjustable circuit means in accordance with variations in the characteristics of the error signal from the phase detector.

4. A speed control circuit for a motor, including, a source for supplying a reference signal of substantially constant frequency, signal means coupled to the motor for developing a signal having a variable frequency related to the instantaneous speed of the motor, a phase detector coupled to said source and to said developing means for comparing the phase of the variable signal with the phase of said reference signal to produce an error signal having variable characteristics in accordance with the results of such comparison, an adjustable amplifier having a gain variable and coupled to said phase detector and to said motor for varying the energy delivered to said motor in accordance with variations in the gain of the amplifier and for providing variations in the gain of the amplifier in accordance with variations in the characteristics of the error signal from said phase detector, and a rough control circuit including first means responsive to a first range of speeds of the motor considerably removed from the operating speed of the motor for increasing the gain of the amplifier to provide for an increase in the energy introduced to the motor, and second means responsive to a second range of speeds of the motor closer to the operating speed of the motor than the first range of speeds for introducing to the adjustable amplifier a signal having variable characteristics in accordance with variations in the speed of the motor in the second range of speeds for varying the energy introduced to the motor in accordance with the variations in the characteristics of such signal.

5. A speed control arrangement for maintaining a motor at an operating speed, including, a fine control arrangement for the motor, a rough control arrangement for the motor, the rough control arrangement having first, second and third control circuits, signal means coupled to the motor for developing a signal having variable characteristics indicative of variations in the instantaneous speed of the motor, means coupled to the signal means and to the fine and rough control arrangements for introducing the signal from the signal means to the fine and rough control arrangements to provide fine and rough controls over the speed of the motor, means operatively coupled to the first and second control circuits for combining the modified signals from the first and the second control circuits in a first particular relationship, said third control circuit including means for comparing the characteristics of the combined signals from said combining means with the characteristics of the signal from said signal means to produce a control signal having characteristic variable in accordance with the results of such comparison, and means operatively coupled to the third control circuit and to the motor for varying the energy introduced to the motor in accordance with variations in the characteristics of the control signal to adjust the speed of the motor.

6. A speed control arrangement for a motor in accordance with claim 5, wherein said circuit means of said first control circuit includes a low pass filter and wherein said circuit means of said second control ciruit inludes a bandpass filter tuned to pass signals in a particular range of frequencies dependent upon the operating speed of the motor.

7. A speed control arrangement for maintaining a motor at an operating speed, including, a source for supplying a reference signal of substantially constant frequency, signal means coupled to the motor for developing a signal having a variable frequency related to the instantaneous speed of the motor, a first phase detector coupled to said source and to said signal means for comparing the phase of the variable signal with the phase of said reference signal to produce an error signal having characteristics variable in accordance with the results of such comparison, an adjustable amplifier having a gain variable to a maximum value and coupled to said first phase detector and to said motor for varying the characteristics of the energy delivered to said motor in accordance with variations in the characteristics of the error signal from said phase detector, a bandpass filter coupled to said signal means and tuned to pass signals in a range of frequencies to the operating speed of the motor, a second phase detector coupled to said bandpass filter and to said signal means for comparing the phase of the signal from said bandpass filter with the phase of the variable signal from said signal means to produce a control signal having characteristics variable in accordance with the results of such comparison, and control means coupled to said second phase detector for introducing the control signal to the adjustable amplifier for adjusting the gain of the adjustable amplifier to obtain variations in the energy introduced to the motor in accordance with variations in the characteristics of the control signal from said second phase detector.

8. A speed control arrangement in accordance with claim 7, including, in addition, a low pass filter coupled to said signal means for passing signals in a range of frequencies corresponding to relatively low speeds of the motor, and means coupled to said low pass filter and to said bandpass filter and to said second phase detector for combining the signals from said low pass and bandpass filters in a particular relationship and for introducing the combined signals to said second phase detector for comparison with said signal from said signal means to obtain the production of the control signal.

9. A speed control arrangement in accordance with claim 7, including, in addition, a low pass filter coupled to said developing means for passing signals in a range of frequencies corresponding to relatively low speeds of the motor, inhibiting means coupled to said low pass filter for inhibiting the passage from the low pass filter of signals which have amplitudes below a particular value; and means coupled to the inhibiting means and to the bandpass filter and to the second phase detector for combining in a particular relationship the signals passed by the inhibiting means and the bandpass filter and for introducing the combined signals to said second phase detector for comparison with said signal from said signal means to obtain the production of the control signal.

10. A speed control arrangement in accordance with claim 7, wherein said control means includes means for effectively inhibiting the introduction of signals below a predetermined value to said adjustable amplifier.

11. A speed control circuit for maintaining a motor at an operating speed in accordance with signals recorded on a recording medium at a frequency related to the operating speed where the medium is driven by the motor, including, a source for supplying a reference signal of substantially constant frequency, tachometer means coupled to the motor for developing a signal having a variable frequency related to the instantaneous speed of the motor, reproducing means disposed relative to said recording medium for reproducing the recorded reference signals to provide a reproduced signal having a frequency related to the speed of the recording medium, switching means coupled to said tachometer means and to said reproducing means, said switching means having a first state of operation for establishing a connection to said tachometer means to pass the signal from said tachometer means and having a second state of operation for establishing a connection to said reproducing means to pass the reproduced signal, a phase detector coupled to said switching means and to said source for comparing the phase of the reference signal with the phase of the signal passing through said switching means to produce an error signal having an amplitude variable in accordance with the results of such comparison, an adjustable amplifier having a gain variable to a maximum value and coupled to said phase detector and to said motor for varying the energy delivered to said motor in accordance with variations in the characteristics of the error signal from said phase detector, frequency responsive means coupled to said switching means for adjusting the gain of said adjustable amplifier by particular amounts in accordance with variations in the frequency of the signal passing through said switching means, and means coupled to said phase detector and to said switching means and responsive to an error signal from said phase detector below a particular amplitude for operating said switching means to the second state and responsive to an amplitude signal from said phase detector above a particular amplitude for operating said switching means to the first state.

12. A speed control circuit for a motor in accordance with claim 11, wherein said frequency responsive means includes first means coupled to said switching means and responsive to a first range of speeds of the motor considerably removed from the operating speed of the motor for adjusting the gain of the adjustable amplifier to the maximum value to obtain the introduction of maximum energy to the motor, and second means coupled to the switching means and responsive to a second range of speeds of the motor between the operating speed of the motor and the first range of speeds for providing adjustments in the gain of the amplifier from the maximum level in accordance with variations in the speed of the motor in the second range to provide corresponding adjustments in the energy introduced to the motor.

13. A speed control circuit for a motor in accordance with claim 11, wherein said frequency responsive means includes a bandpass filter coupled to the switching means and tuned to a signal frequency related to the operating speed of the motor, a second phase detector coupled to said bandpass filter and to said switching means for comparing the phase of the signal from said bandpass filter with the phase of the signal passing through said switching means to generate a control signal having characteristics in accordance with the results of the comparison, and control means coupled to said second phase detector and to the adjustable amplifier for adjusting the gain of the adjustable amplifier in accordance with the variations in the characteristics of the control signal from said second phase detector to provide variations in the energy introduced to the motor.

14. A speed control circuit in accordance with claim 13, wherein said control means includes means for effectively inhibiting the passage of signals below a particular amplitude to said adjustable amplifier.

15. A speed control circuit in accordance with claim 13, including, in addition, a low pass filter coupled to said switching means for passing signals at relatively low frequencies corresponding to relatively low speeds of the motor, means coupled to said low pass filter for inhibiting the passage of signals below a particular amplitude from the low pass filter, and means coupled to the inhibiting means and to the bandpass filter and to said second phase detector for combining the signals from the inhibiting means and the bandpass filter in a particular relationship and for introducing the combined signals to said second phase detector for comparison with said signal from said signal means to generate the control signal.

References Cited by the Examiner

UNITED STATES PATENTS

| | | | |
|---|---|---|---|
| 2,782,355 | 2/57 | Wilcox | 318—314 |
| 2,932,778 | 4/60 | Curtis | 318—314 |
| 3,016,428 | 1/62 | Kabell et al. | 318—314 |

ORIS L. RADER, *Primary Examiner.*

JOHN F. COUCH, *Examiner.*